United States Patent Office 3,772,255
Patented Nov. 13, 1973

3,772,255
RING-OPENING POLYMERIZATION
OF CYCLOOLEFINS
Anthony J. Bell, Stow, Ohio, assignor to The Goodyear Tire & Rubber Company, Akron, Ohio
No Drawing. Continuation-in-part of abandoned application Ser. No. 98,450, Dec. 15, 1970. This application June 7, 1972, Ser. No. 260,606
Int. Cl. C08f 1/34
U.S. Cl. 260—88.2 D
4 Claims

ABSTRACT OF THE DISCLOSURE

There is disclosed a method for the ring-opening polymerization of cycloolefins which uses as a catalyst a mixture of tungsten oxide and either aluminum chloride or alkyl aluminum dichloride, wherein the alkyl radicals contain from 1 to 10 carbon atoms.

This application is a continuation-in-part of application Ser. No. 98,450, filed Dec. 15, 1970, now abandoned.

This invention is directed to a novel ring-opening polymerization system useful for the production of polyalkenamers. More specifically, this invention is directed to a ring-opening polymerization of cycloolefins utilizing as catalysts compositions comprising mixtures of tungsten trioxide in conjunction with alkyl aluminum dichlorides containing from 1 to 10 carbon atoms in the alkyl group or aluminum trichloride.

In accordance with this invention, cycloolefins are polymerized in the presence of a catalyst comprising tungsten trioxide and at least one compound selected from the group of aluminum trichloride and alkyl aluminum dichloride wherein the alkyl groups contain from 1 to 10 carbon atoms.

This ring-opening polymerization can be conducted in a straight-forward manner. For instance, the cycloolefin can be diluted in an inert solvent such as pentane, hexane, cyclohexane, benzene or any other inert hydrocarbon solvent including halogenated hydrocarbons. On the other hand, these ring-opening polymerizations can be conducted in bulk.

The temperature at which the ring-opening polymerizations are conducted is usually very mild conditions such as room temperature, however, the extremes in temperature may be employed such as $-100°$ C. up to several hundred ° C., i.e., 250° C.

The pressures employed are usually ambient. However, that is not to say that subatmospheric pressures cannot be employed as well as superatmospheric pressures. In other words, the reaction conditions as far as pressure and temperature is concerned are not critical in this invention.

In utilizing the catalyst system employed in this invention, the individual catalyst components may be either brought into contact with the cycloolefin separately where they are interreacted and form the catalyst to promote the ring-opening polymerization, or they may be mixed together prior to contact with the cycloolefin to be polymerized.

Representative of the cycloolefins which may be polymerized in accordance with this invention are cyclobutene, cyclopentene, cyclooctene, cyclononene, cyclododecene, 1,4- and 1,5-cyclooctadiene, 1,4-, 1,5- and 1,6-cyclodecadiene, 1,4,6- and 1,4,7-cyclododecatriene, and the like. In other words, any cycloolefin which contains at least four and not more than five carbon atoms in the cyclic ring and containing at least one carbon-to-carbon double bond in the cyclic ring, may be employed. Also, cycloolefins containing at least eight carbon atoms in the cyclic ring and not more than twelve, may be employed. These olefins may contain one, two or three double bonds so long as the double bonds are not conjugated.

Furthermore, the cycloolefins mentioned above may be substituted by various substituents such as halogens or alkyl or even aryl radicals. Representative of such substituted cycloolefins are 1,5,9-trimethylcyclododecatriene, 3-phenyl, cyclooctene-1, 3-benzylcyclooctene-1, 5-chlorocyclooctene-1, 5-chlorocyclooctadiene and other substituted cyloolefins. One particularly suitable compound is the adduct of 1,5-cyclooctadiene and hexachlorocyclopentadiene, alternatively named 1,10,11,12,13,13-hexachlorotricyclo[8.2.1.0$^{2,9}$]trideca-5,11-diene.

The catalyst to which this invention is directed comprises a mixture of tungsten trioxide ($WO_3$) and either aluminum trichloride ($AlCl_3$) or an alkylaluminum dichloride ($RAlCl_2$) wherein the alkyl radical can vary from 1 to 10 carbon atoms.

The catalyst of this invention, as indicated, comprises two components. The molar ratio of the first catalyst component, that is, tungsten oxide, to the second catalyst component, aluminum chloride or alkylaluminum dichloride, may range from 3:2 to 2:3. The ratio of the two catalyst components has not been found to be critical whatsoever as far as the catalyst being an effective catalyst is concerned. However, it has been observed that the activity of the catalyst system can be enhanced if the ratio of the chloroaluminum component to the tungsten component is increased.

With respect to the amount of catalyst required, good results in ring opening polymerization of cyclopentene or cyclooctene have been obtained when as little as 0.01 mole of catalyst per mole of cyclopentene or cyclooctene is employed. Likewise, if the catalyst of this invention is employed as an olefin metathesis catalyst, as little as 0.02 mole of catalyst per mole of internal oelfin, such as 2-pentene, will be sufficient.

The following examples as set forth illustrate this invention and are intended to be illustrative rather than limitative of the scope of this invention.

EXAMPLE I

To a previously dried 4-oz. bottle was placed 12 milliliters of freshly distilled cyclopentene. To this monomer were added 0.5 gram of $WO_3$ and 0.1 gram of $AlCl_3$. The container was then flushed with nitrogen, capped and allowed to stand at approximately 20° C. for 16 hours. Coagulation of the product with methanol and drying gave a 53 percent yield of the polypentenamer rubber from the ring opening polymerization of the cyclopentene.

EXAMPLE II

To a previously dried 4-oz. bottle were placed 5 milliliters of freshly distilled cyclopentene and 0.5 gram of $WO_3$. The container was then flushed with nitrogen and capped with a self-seal cap. Using a long needle syringe, 3 milliliters of a 0.1 M solution of ethylaluminum dichloride (EADC) was injected into the mixture in the container through the self-seal cap. After standing for 18 hours at approximately 20° C. the reaction mixture was processed as in the previous example. A 48 percent yield of the polypentenamer rubber was obtained.

EXAMPLE III

To a previously dried 4-oz bottle was placed 10 milliliters of cyclooctene. To the monomer was added 0.7 gram of $WO_3$ and 0.2 gram of $AlCl_3$. The container was flushed with nitrogen, capped and allowed to stand at approximately 20° C. for 18 hours. An 11 percent yield of polyoctenamer rubber was obtained.

While certain representative embodiments and details have been shown for the purpose of illustrating the in-

What is claimed is:

1. The cycloolefin ring-opening polymerization process which comprises polymerizing at least one cycloolefin selected from the group of cycloolefins containing at least 4 and not more than 5 carbon atoms in the cyclic ring and containing one carbon-to-carbon double bond and cycloolefins containing at least 8 carbon atoms and not more than 12 carbon atoms in the cyclic ring and containing 1, 2 or 3 double bonds, said double bonds being nonconjugated, in the presence of a catalyst comprising tungsten trioxide and at least one compound selected from the group of aluminum trichloride and alkyl aluminum dichlorides containing from 1 to 10 carbon atoms in the alkyl group, in which the molar ratio of the tungsten trioxide to the aluminum chloride or alkyl aluminum dichloride may range from 3/2 to to 2/3, said catalyst being employed in an amount of at least 0.01 mole of catalyst per mole of cycloolefin.

2. The process according to claim 1 in which the catalyst comprises tungsten trioxide and aluminum trichloride.

3. The process according to claim 1 in which the catalyst comprises tungsten trioxide and an alkyl aluminum dichloride in which the alkyl radical contains from one to ten carbon atoms.

4. The process according to claim 1 in which the cycloolefin is a mixture of 1,5-cyclooctadiene and the adduct of 1,5-cyclooctadiene and hexachlorocyclopentadiene.

References Cited
UNITED STATES PATENTS

| | | | |
|---|---|---|---|
| 2,882,325 | 4/1959 | Luvisi et al. | 260—671 |
| 3,066,123 | 11/1962 | Strohmayer et al. | 260—93.1 |
| 3,074,918 | 1/1963 | Eleuterio | 260—93.1 |
| 3,714,138 | 1/1973 | Cook | 260—93.1 |

JOSEPH L. SCHOFER, Primary Examiner

S. M. LEVIN, Assistant Examiner

U.S. Cl. X.R.

260—93.1